United States Patent

[11] 3,589,182

| [72] | Inventor | Donald K. Burgett<br>Tallmadge, Ohio |
|---|---|---|
| [21] | Appl. No. | 836,564 |
| [22] | Filed | June 25, 1969 |
| [45] | Patented | June 29, 1971 |
| [73] | Assignee | The Goodyear Tire & Rubber Company<br>Akron, Ohio |

[54] TIRE TESTING APPARATUS
7 Claims, 17 Drawing Figs.

[52] U.S. Cl. .................................................. 73/146
[51] Int. Cl. ............................................... G01m 17/02
[50] Field of Search .......................................... 73/146; 33/203.13

[56] References Cited
UNITED STATES PATENTS

| 3,478,582 | 11/1969 | Hough | 73/146.2 |
| 3,142,178 | 7/1964 | Gough et al. | 33/203.1 X |

FOREIGN PATENTS

| 968,319 | 9/1964 | Great Britain | 73/146 |
| 171,143 | 10/1965 | U.S.S.R. | 73/146 |

*Primary Examiner*—Louis R. Prince
*Assistant Examiner*—Daniel M. Yasich
*Attorneys*—F. W. Brunner and Michael L. Gill ABSTRACT: A method and apparatus for continuously measuring the variations in forces exerted by the tread of a rotating tire on its tread supporting surface, said apparatus containing a substantially planar moving support means whereby a flat footprint is maintained in the rotating tread of a tire while a sensing means continuously detects and measures the variations in the forces exerted by the tread on the support means.

The foregoing abstract is not to be taken as limiting the invention of this application, and in order to understand the full nature and extent of the technical disclosure of this application, reference must be made to the accompanying drawings and the following detailed description.

INVENTOR.
DONALD K. BURGETT
BY Michael L. Gill
ATTORNEY

INVENTORS
DONALD K. BURGETT

BY Michael L. Gill
ATTORNEY

INVENTOR.
DONALD K. BURGETT
BY Michael L. Gill
ATTORNEY

TIRE TESTING APPARATUS

This invention relates to a method and apparatus for detecting structural imperfections in a tire without its destruction. More particularly, this invention relates to a method and apparatus for detecting and measuring the physical discontinuities or structural imperfections in a tire by continuously measuring the variation in forces exerted by the rotating tire tread on a generally planar support means or anvil.

It is known that even new tires can have structural imperfections which affect its balance and riding qualities. One characteristic of a tire which is affected by these structural imperfections is the variation in forces exerted by the tread on its tread supporting surface while the tire is rotating. These force variations can have a serious effect on the riding qualities and characteristics of the tire. It is therefore desirable to test tires in order to determine the exact nature and extent of these variations in forces exerted by the rotating tire on its tread supporting surface. In order to get as accurate a reading of these forces as possible, it is desirable to simulate as close as possible the road conditions under which a tire is operated and at the same time, measure all components of the varying forces exerted by the tire tread on its supporting surface under these conditions. Having determined the nature and extent of these force variations, it is then possible for the tire engineer to first, design new and better tires to avoid such structural imperfections, and second, make it possible to repair or adjust such tires which have high force variation readings in order to make them acceptable for use on automobiles.

For purposes of this invention, radial force shall mean that force acting through the footprint of a tire in a radial direction with respect to the rotational axis of the tire. Lateral force shall mean the force acting through the footprint of the tire and parallel to the rotational axis of the tire. Rolling resistance force shall mean forces acting through the footprint, lying in the plane of the footprint and perpendicular to the axis of rotation. The footprint is that portion of the tread surface that is deflected by and supported by the surface on which the tire is supported.

An object of this invention is to provide a method and apparatus for closely simulating the action of a tire tread as it would be in actual operation on a road and at the same time continuously measuring the variation in forces exerted by the footprint under such simulated conditions. It is a further object of this invention to isolate the various components of the force exerted by a tread on its supporting surface. Still another object of this invention is to provide a method and apparatus for isolating and measuring the force variation in separate portions of the footprint of a rotating tire.

The invention accordingly consists of the features of construction, combination of elements and arrangement of parts which will be exemplified in the construction hereinafter set forth. Further objects and advantages can be more readily seen and understood by reference to the specification and the drawings wherein:

Figures 1, 2:
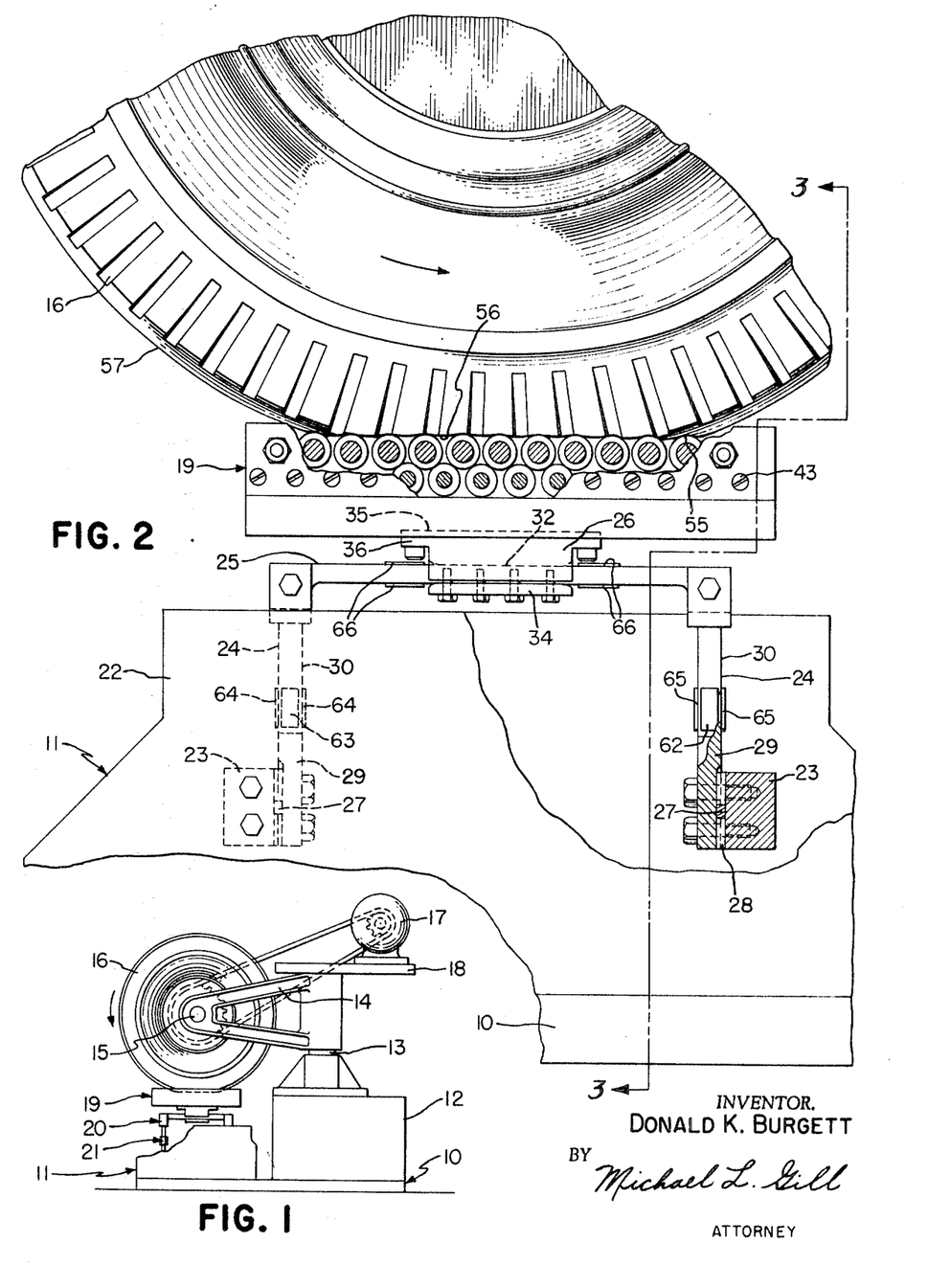
FIG. 1 is a side elevational view of an apparatus constructed in accordance with this invention with a tire positioned thereon.
FIG. 2 is an enlarged side elevational view of a portion of the apparatus of FIG. 1.

With reference to the drawings and more particularly FIG. 1, the apparatus of this invention comprises a generally horizontal base member 10 having mounted thereon a structure 11 for rotatably supporting a tire tread and a hydraulic ram means 12. A ram shaft 13 protrudes vertically upwardly from the top of the hydraulic ram means 12 and has a cantilevered frame 14 mounted thereon which carries a rotatable spindle 15 for supporting a tire 16. A drive motor 17 for rotating the spindle 15 and the tire 16 is mounted on a plate 18 which is in turn mounted on the top of the aforementioned ram shaft 13 enabling the motor 17 to move with the spindle 15 as the ram shaft 13 is moved up and down. By actuating the hydraulic ram means 12, the tire 16 mounted on the rotatable spindle 15 can be moved toward and away from the tire supporting structure 11. The structure 11 for supporting a tire tread comprises a movable planar support means or anvil 19 supported by a series of strain arms 20 which are ultimately supported by the base.

A tire 16 to be tested is mounted on the rotatable spindle 15 and controllably urged against the supporting surface or anvil 19 by means of the hydraulic ram 12. As the tire 16 is rotated, it exerts a varying force on the supporting surface or anvil 19 which is transmitted through the strain arms 20 to the strain gauges or load cells 21 which in turn relay the signal to suitable electronic equipment for transmission into force variation readings.

Figure 3:
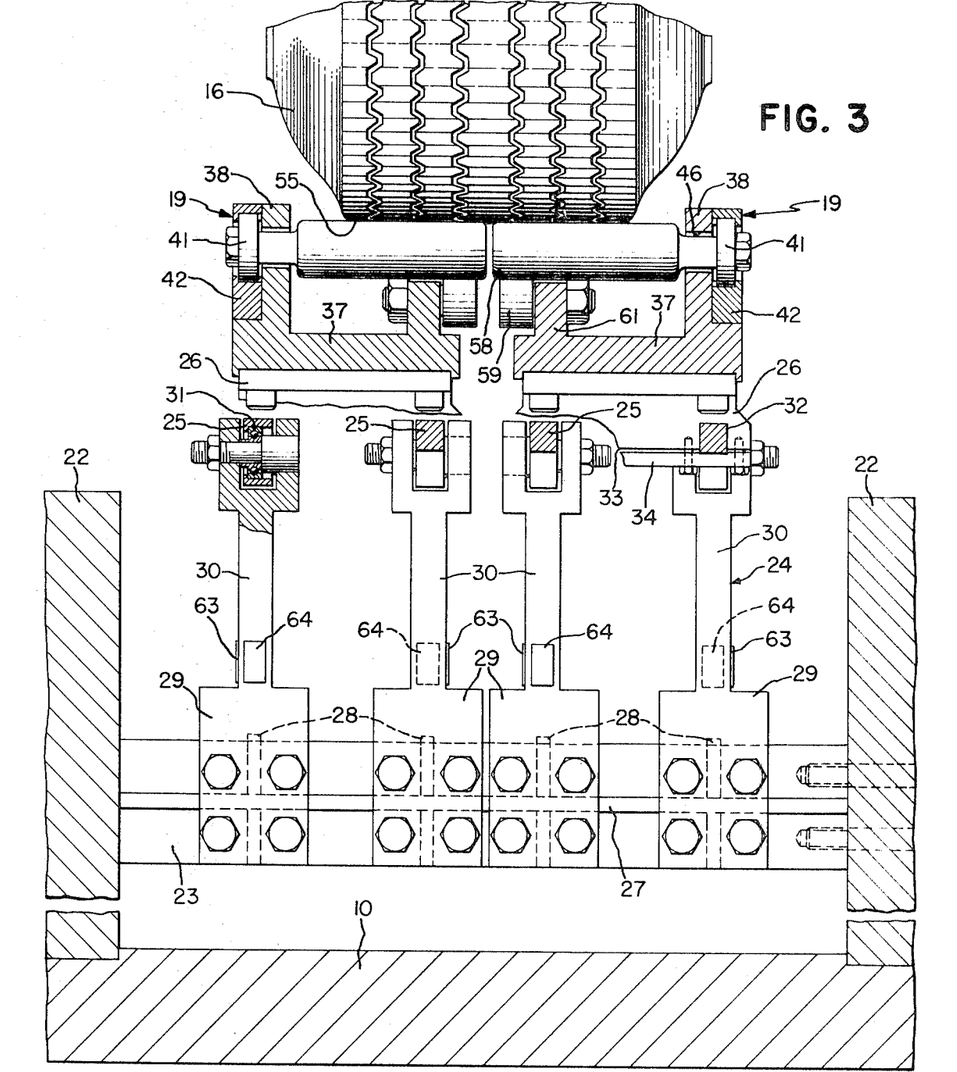
FIG. 3 is a view of the apparatus of FIG. 2 taken substantially along line 3–3.
Figure 4:
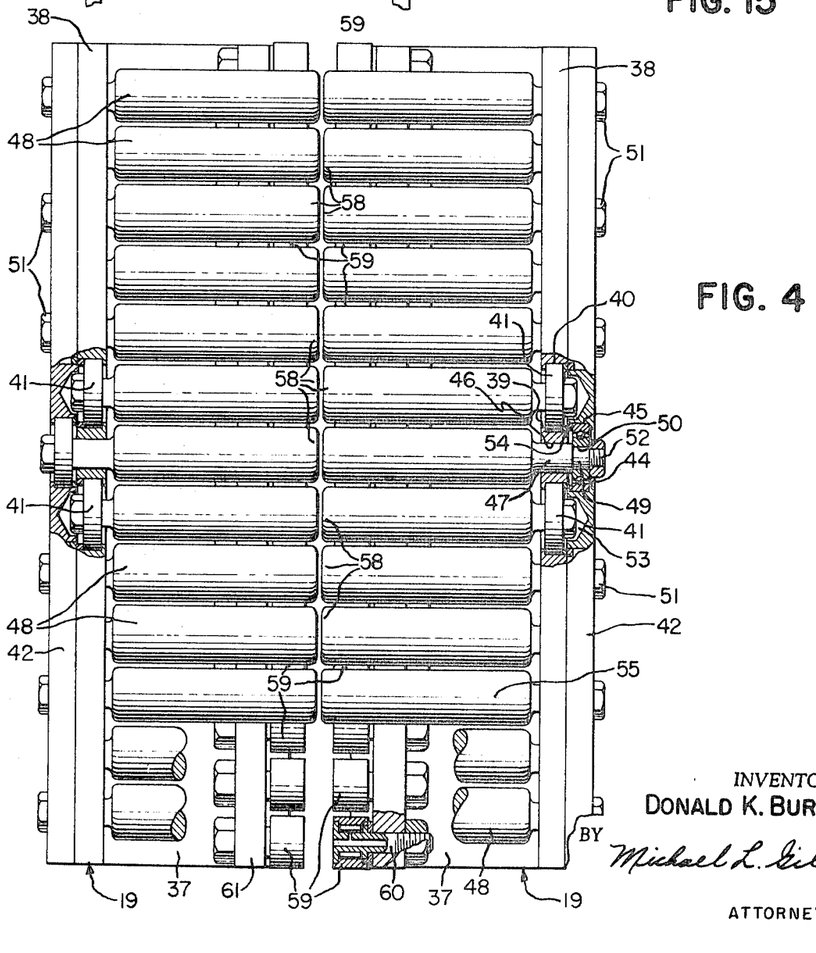
FIG. 4 is a top view of the anvil means of FIG. 2.

More particularly, and with reference to FIGS. 2, 3 and 4, the apparatus of this invention comprises a generally horizontal base member 10 having two upstanding sidewalls 22 with a pair of parallel horizontal beams 23 supported therebetween. Eight identical upstanding strain legs 24 are rigidly mounted on the horizontal beams 23 and are arranged in groups of four on the four corners of a rectangle in order to pivotally support the ends of a pair of identical parallel horizontal strain bars 25 at their upper ends. Each pair of strain bars supports a clamping mechanism 26 at their centers for supporting one of the generally planar support means or anvils 19. In the embodiment illustrated, there are two planar support means or anvils 19. The two anvils have their upper sides lying in the same plane, are parallel and as close together as is possible without interfering with the operation of each other when subjected to the load of a tire or to thermal change. It is desirable to have these anvils as close together as possible in order to provide a very nearly continuous tread supporting surface. The closeness attainable is in part dependent upon the rigidity of the anvil supporting structure.

The precise position and orientation of each strain leg 24 is assured in this particular embodiment by providing a horizontal 27 and vertical 28 keyway and keys in the rectangular bottom portion 29 of each leg 24 which mate with keyways in the beams 23. The central shank portion 30 of each leg 24 is square with one pair of sides parallel to the line of motion of the footprint on the anvil means 19. The upper end of each leg contains a bearing 31 which pivotally supports the ends of the strain bars 25.

Each clamping mechanism 26 is provided with a pair of rectangular parallel grooves 32 in the bottom side 33 for receiving the central portions of a pair of the parallel bars 25. Each bar is secured in its respective groove 32 by a flat clamping plate 34 located below the clamping mechanism 26 and bolted thereto. The upper side 35 of each clamping mechanism is flat and provided with a pair of flanges 36 on its opposite ends which serve as means for bolting the clamping mechanism to the bottom of the anvil means 19. In the embodiment illustrated, both clamping mechanisms 26 are identical and preferably provide the same length of rigidly clamped portion on each strain rod.

As best seen in FIGS. 3 and 4, each anvil means has a generally flat bedplate 37 and an upstanding first bearing support plate 38 close to and parallel to the outer side. A plurality of holes 39 are provided through the first bearing support plate 38 having their axis parallel and in a single plane. Each hole is counterbored as at 40 from the outside to provide a seat for a bearing 41. A second bearing support plate 42 is mounted along the outside of the first bearing support plate 38 by suitable means such as capscrews 43. This plate also is provided with a plurality of holes 44 which have their axes parallel to and in the same plane as the axes of the holes in the first bearing support plate. Each hole 44 in this second plate 42 is positioned midway between a pair of holes 39 in the first plate 38 and is counterbored as at 45 from the inside to receive a bearing 41. A second series of holes 46 is provided in the first bearing support plate 38, each of which is coaxial with a hole 44 in the outer support plate 42 to permit the journal 47 of the rollers 48 to pass through to the bearing 41 in the second plate 42. This alternate placement of the bearing counterbores in the two different plates permits closer placement of the rollers 48 which have smaller outside diameters than the bearings, which is particularly important to the end of providing as many support lines in a single plane in order to provide a substantially flat footprint in the tire. Each roller 48 has a reduced diameter portion or journal 47 on its outer end which extends through the hole 39 or 44 in its respective bearing plate 38 or 42. A second reduced diameter portion 49 in the same end of each roller is received in the inner bore 50 of the respective bearing 41 in the respective bearing plate. The inner race of the bearing 41 is clamped tight on the roller 48 by means of a nut 51 received over the threaded end 52 of the roller 48. The outer bearing plate 42 is counterbored as at 53 opposite each bearing 41 in the inner or first plate 38 to accommodate the locking nut. A spacer ring 54 is received in each counterbore 40, 45 for each bearing next to the outer race. When the outer bearing plate is bolted to the inner plate, it draws these rings 54 up tight against the outer races and secures their axial position.

The bearings 41 being thus clamped by the inner race to the rollers 48 and by the outer race to the bearing support plate 38 or 42 permit rotary motion of each roller 48, but do not permit motion of the rollers in the axial direction. This radial and axial thrust arrangement is necessary in order to provide an anvil free of side motion that would distort tread force variation readings. As best seen in FIG. 2, the close placement of small diameter rollers provides a multiplicity of closely spaced support lines 55, which in turn provides a generally planar support means which is capable of providing a substantially flat footprint 56 in the rotating tire tread 57.

The inner end 58 of each roller 48 is supported by a pair of roller cams 59 disposed close to the inner edge of the bedplate 37. Each cam is rotatably mounted on a horizontal shaft 60 supported in cantilever fashion on an upright wall 61 on the bedplate 37 located beneath the rollers 48, which is parallel to and removed from the inner edge of the bedplate 37. This arrangement is one method of supporting the inner ends of the rollers that allows very close placement of the pair of anvils 19, as seen in FIG. 3.

The strain legs 24 for each planar support means or anvil 19 are provided with two pairs 62, 63 of axial force strain gauges mounted in the conventional manner on the sides to the legs, parallel to the long axis of the anvil 19. The long axis of the anvil 19 shall be construed to mean a line which passes through the center of and parallel to the line of motion of the footprint and is tangent to the upper tread supporting points of the anvil 19. The strain legs are also provided with two pairs of rolling resistance strain gauges 64, 65 mounted on the sides of the legs parallel to the rollers 48. Each horizontal strain bar 25 is provided with a pair of radial force strain gauges 66, one mounted on the top on one side of the clamping mechanism 26, and the other mounted on the bottom on the opposite side of the clamping mechanism 26. Each strain gauge is located the same distance from the clamping mechanism and the strain gauges on one strain bar are in opposite hand orientation from those on the corresponding other parallel strain bar.

Figure 17:
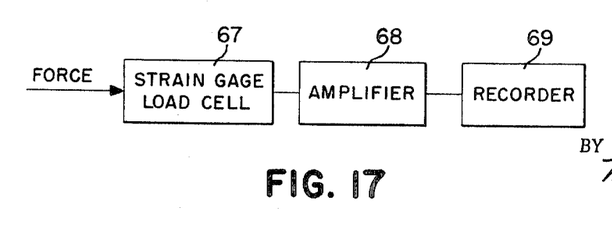
FIG. 17 is a block diagram of the electrical equipment used in conjunction with the apparatus of this invention.

With reference to FIG. 17 each two pairs of strain gauges (axial force, rolling resistance and radial) comprise a strain guage load cell 67 capable of continuously monitoring the respective force variations and transmitting them to an amplifier 68 which in turn relays the measurements to a gauge or recorder 69.

In the operation of the machine, a rotating tire 16 is urged against the planar support means or anvil 19 which, in turn, causes a generally flat deflection or flat footprint 56 in the tire tread. The radial force exerted on the tire causes a deflection in the horizontal strain bars 25. The amount of deflection is a measure of the force exerted. This deflection is continuously picked up by the radial force strain gauges 66 on the top and bottom of the bars and transmitted through electronic equipment and converted to a continuous force reading. Any force exerted by the tread on the planar surface or anvil 19 in a direction parallel to the rotational axis of the tire 16 will cause deflection in the vertical strain legs 24 in the direction of the force. This force is picked up by the strain gauges 62 and 63 on the sides of the legs parallel to the long axis of the anvil 19 and again transmitted to electronic equipment for conversion into force readings. Any rolling resistance will cause deflection of the strain legs 24 in the direction of motion of the footprint. This deflection is picked up by strain gauges 64 and 65 on the front and back of the legs 24 and transmitted to electronic equipment for conversion into force readings.

Figures 5, 16:
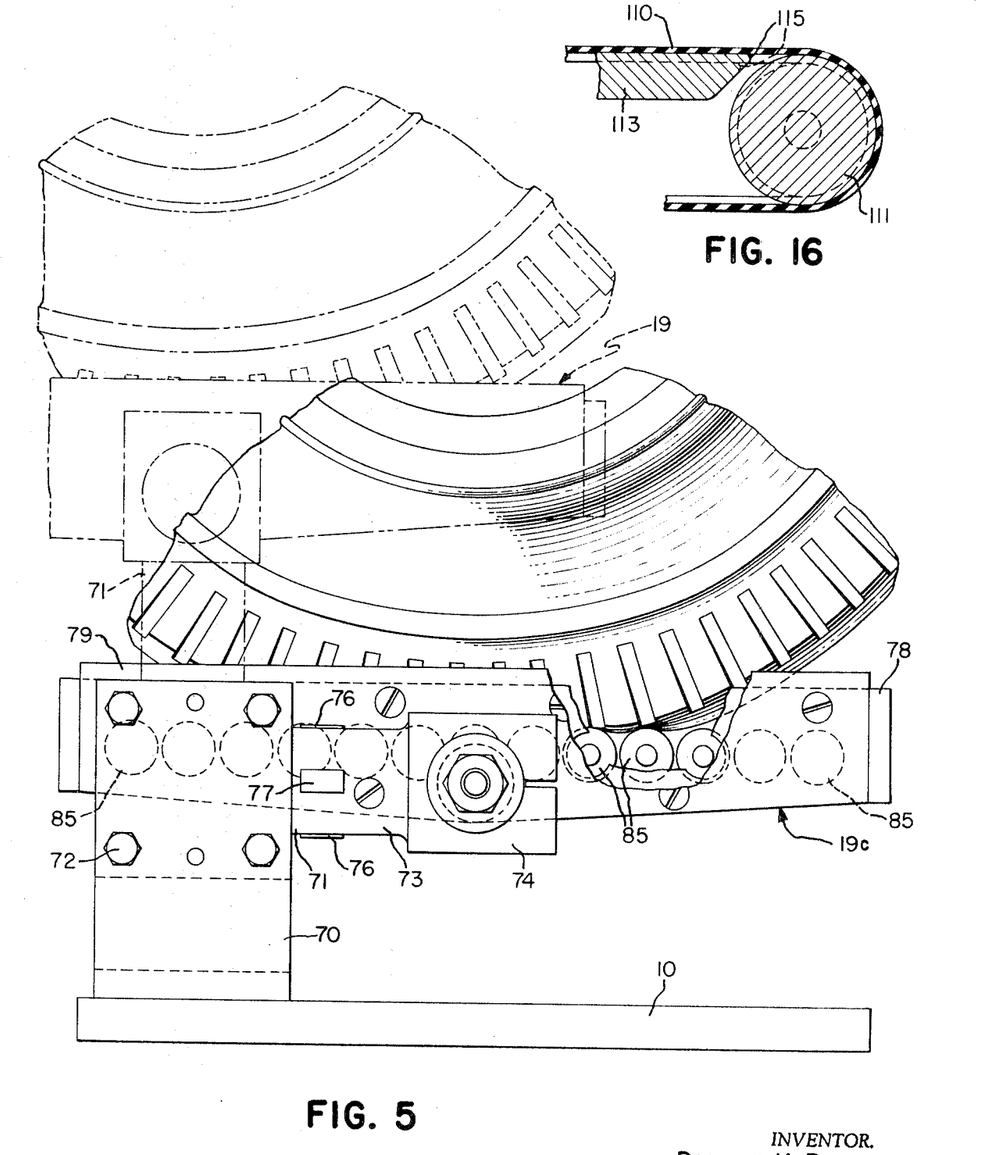
FIG. 5 is an elevational view of an alternate embodiment of the apparatus of this invention with a tire positioned thereon.
FIG. 16 is a partial sectional view of the apparatus of FIG. 12 taken substantially along line 16–16.
Figure 6:
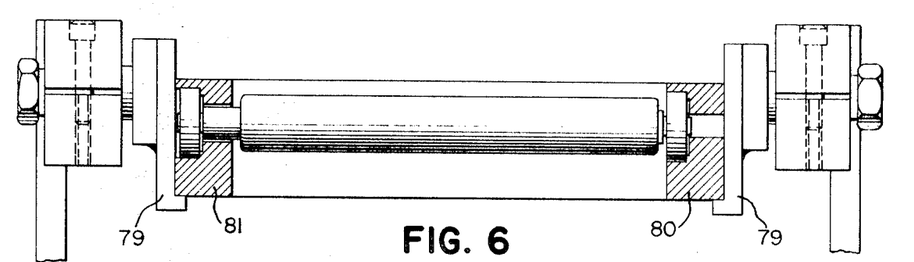
FIG. 6 is a partial end view of the apparatus of FIG. 5.
Figure 7:
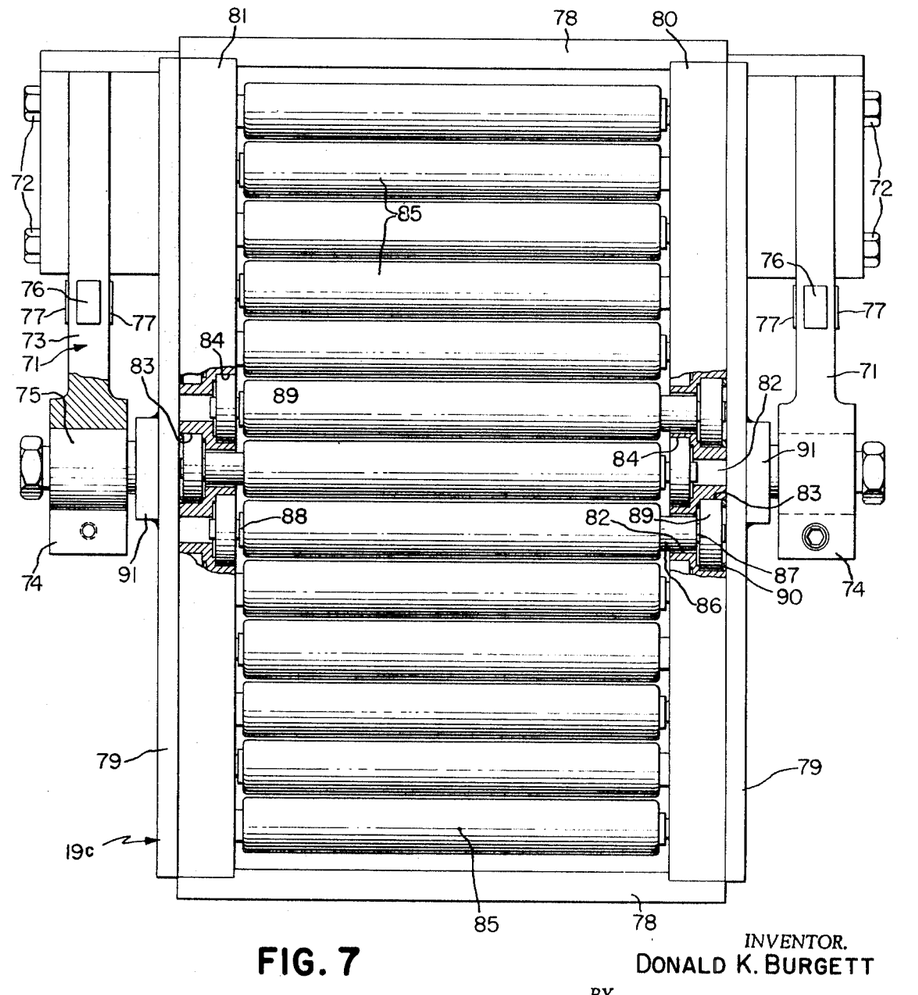
FIG. 7 is a partial top view of the apparatus of FIG. 6.

In an alternate embodiment of the invention illustrated in FIGS. 5, 6 and 7, the invention comprises a pair of parallel upstanding sides 70 rigidly mounted on the base 10. A pair of horizontal strain arms or support arms 71 are bolted to the sides by means of capscrews 72. Each arm 71 has a rectangular central shank portion 73 and clamping eye 74 at the end opposite the upstanding sides 70 for clamping a bearing housing 93 which pivotally supports the anvil means 19.

Each support arm 71 is provided with a strain gauge 76 on the top and bottom and a strain gauge 77 on the sides of the rectangular portion 73. All strain gauges 76 or 77 are located the same distance from the clamping eye 74. When the arms 71 are in the horizontal position, the four strain gauges 76 on the tops and bottoms of the arms 71 comprise a strain gauge load cell capable of monitoring radial force variations while the four strain guages 77 on the sides comprise strain gauge load cell capable of monitoring the axial force variations. When the support arms 71 are moved to the vertical position as illustrated in chain dotted lines in FIG. 5, the strain gauges 76 that are on what was the tops and bottoms of the arms 71 are now positioned relative to the anvil 19 such that they can monitor the rolling resistance variation.

In the embodiment illustrated in FIGS. 5, 6 and 7, the anvil 19c comprises two end plates 78, two sideplates 79 and two bearing support plates 80, 81 disposed inside of and adjacent to the sideplates 79. The bearing support plates 80 and 81 are provided with a plurality of holes 82, all having their axes parallel and lying in a single plane. The holes are counterbored as at 83 and 84 on alternately opposite sides of the bearing support plate to receive a bearing 89. Again, this alternate counterboring of the bearing plates 80 and 81 to receive the bearings permits closer spacing of the rolls 85. Each bearing counterbore 83 on the outside of the first bearing plate 80 has a corresponding inner counterbore 84 on the opposite plate 81 and conversely every inner counterbore 84 on the first plate 80 has a corresponding outer counterbore 83 on the opposite plate 81. Each roll is provided with a first reduced diameter portion 86 which is receivable through the hole 82 in the bearing plate 80 or 81. A second reduced diameter portion 87 on the same end of each roll is received in the inner bore of the bearing 89 which is received in the outer counterbore 83 in the bearing support plate 80 or 81. The opposite end of each roll has a shorter first reduced diameter 88 portion since it does not have to pass through a hole 82 to reach the bearing received in the inner counterbore 84. The rolls are assembled with long 86 and short 88 first reduced diameter portions alternating so as to stagger the bearings in the bearing plates 80 and 81, as described previously. The bearing support plates 80 and 81 and rolls 85 thus assembled, are clamped together by means of end plates 78 bolted to the ends of the respective bearing support plates 80 and 81. A clamping washer 90 is received in each outer counterbore 83 next to the outer race of each bearing 89. Side clamping plates 79 are bolted over the bearing support plates 80 and 81 and tighten the clamping washer against the respective outer bearing race. This secures all rollers 85 in position so that there is no axial movement of the rollers. This is necessary in order to prevent axial movement of the rollers from distorting the axial force variation readings.

A pair of coaxial trunnions 91 are rigidly mounted on the sideplates 79 as by welding. The sideplates 79, when bolted on the opposite sides of the bearing support plates 80 and 81, have their trunnions protruding outwardly from the anvil 19c and have a common axis. The axis of the trunnion 91 is located centrally of and in a plane tangent to top portions of the rolls 85.

Figure 11:
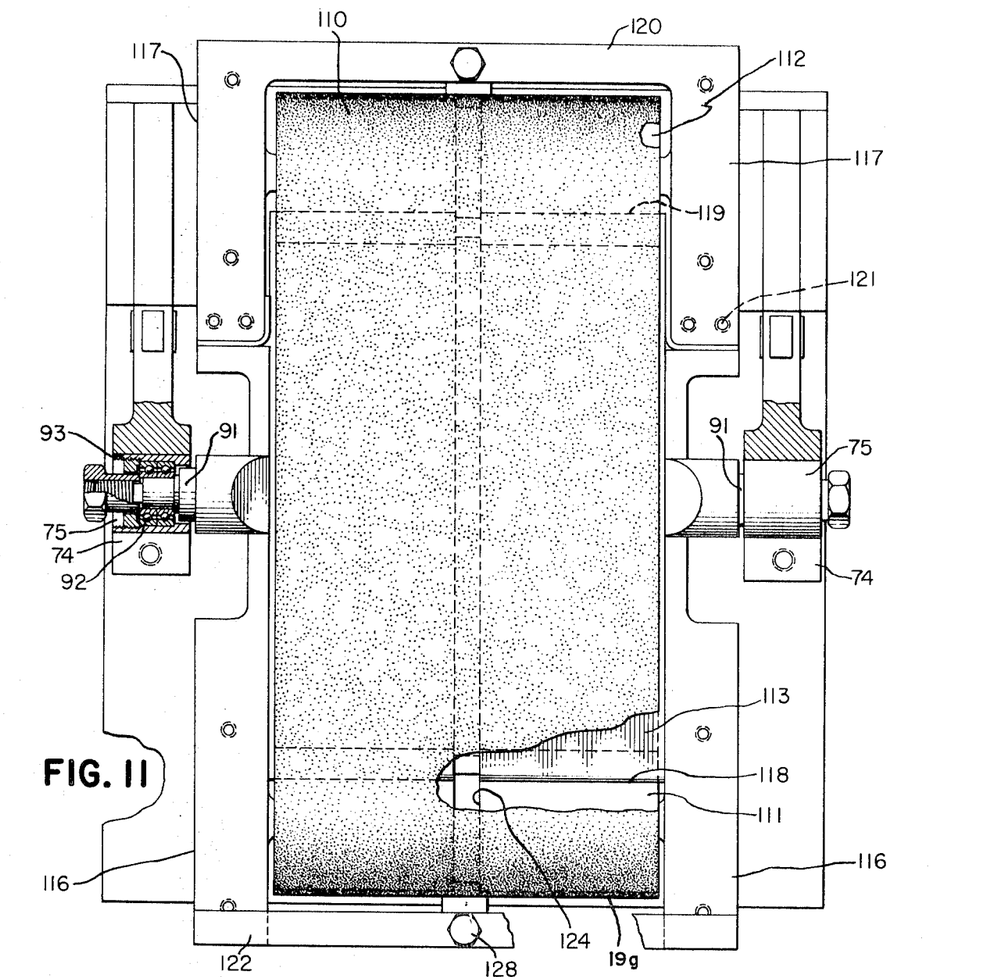
FIG. 11 is a further embodiment of an anvil means constructed in accordance with this invention.

Each trunnion is provided with a bearing arrangement 92 and bearing housing 93, best seen in FIG. 11 and illustrated in conjunction with an alternate embodiment of the anvil 19c, which is clamped in the clamping eye 74 and pivotally supports the trunnions 91. The bearings are mounted in a conventional manner to resist radial and axial thrust and thereby restrict the movement of the anvil 19g relative to the support arms to pivotal motion about the trunnion axis. This antifriction trunnion support means is provided in order to prevent any torque from being transmitted through the trunnion 91 to the strain arms 71 and distort the radial force readings.

Figure 8:
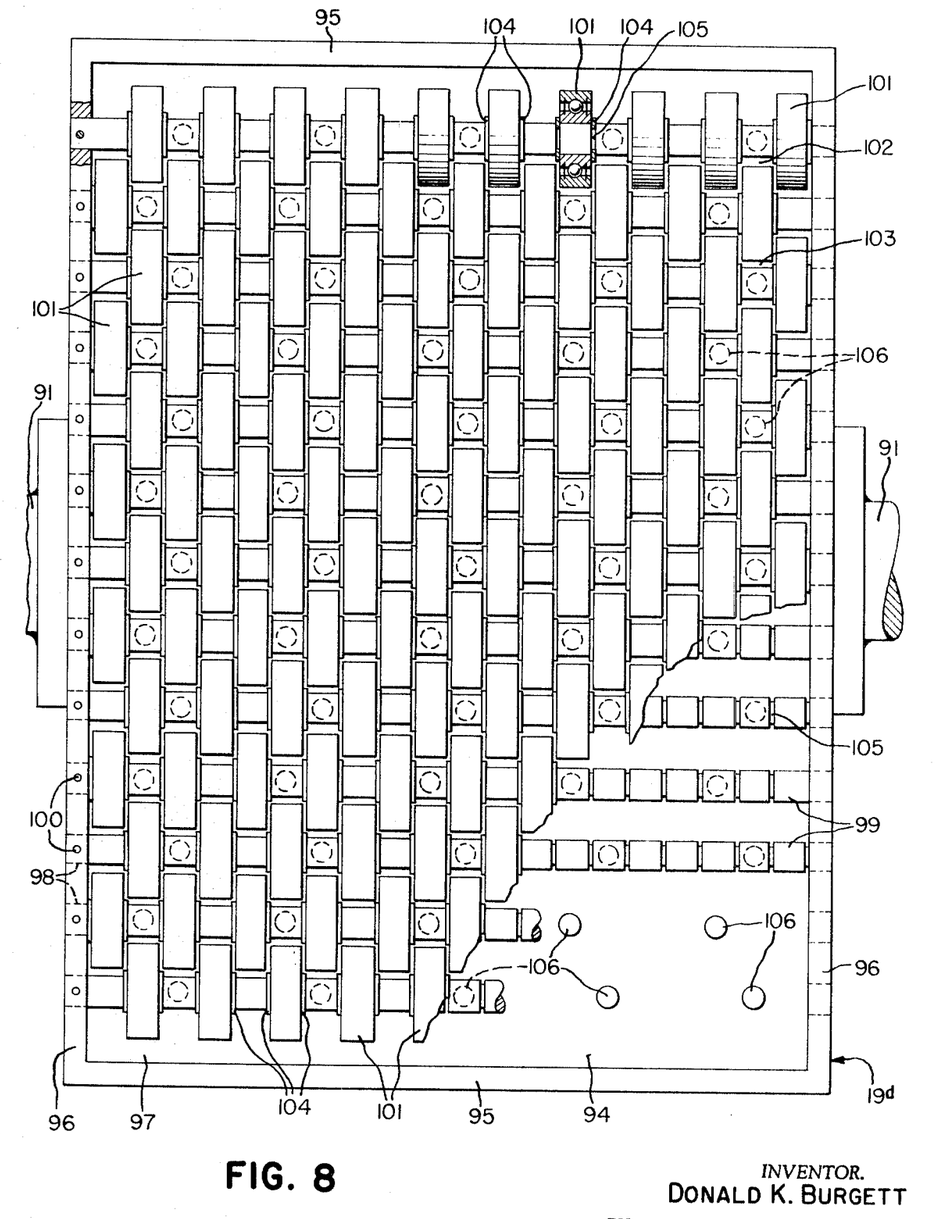
FIG. 8 is a top view of a further embodiment of an anvil means constructed in accordance with this invention.

A further embodiment of the invention illustrated in FIG. 8, the planar support means or anvil 19d comprises a rigid rectangular box member 94 having two ends 95, two sides 96 and a bottom 97. The sides 96 of the rectangular box member support the ends 98 of a series of closely spaced parallel rods 99 having their axes lying in a single plane. Each rod is secured in position in the sides 96 by means of dowel pins 100. A multiplicity of bearings 101 are received over the rods 99. The rods 99 are close enough together, such that a bearing 101 received over one rod 99 very nearly touches the adjacent rods 99 as at 102 and 103. The bearings 101 on adjacent rods 99 are placed in alternate positions along the rods to avoid interference between such bearings. Each bearing 101 is secured in its axial position on the rod 99 by means of snaprings 104 received in grooves 105 on opposite sides of the bearing and is capable of resisting thrust in its axial direction. This close spacing of the rods and alternate spacing of the bearings provides an anvil means having a multiplicity of short support lines lying in a single plane which very nearly approaches planar support surface for a tire riding thereon. To provide additional support throughout the length of each rod 99, a series of upstanding posts 106 are welded to the bottom 97 of the box 94 and engage the bottom side of the rods 99 at various points between two bearings 101.

This planar support means or anvil 19d also has a pair of trunnions 91 mounted on the sideplates similar to those described above and illustrated in FIG. 7. Again, the common axis of the trunnions 91 is located centrally of and in the same plane as that tangent to the tops of the bearings 101 and is parallel to the rotational axis of the tire 16.

Figure 9:
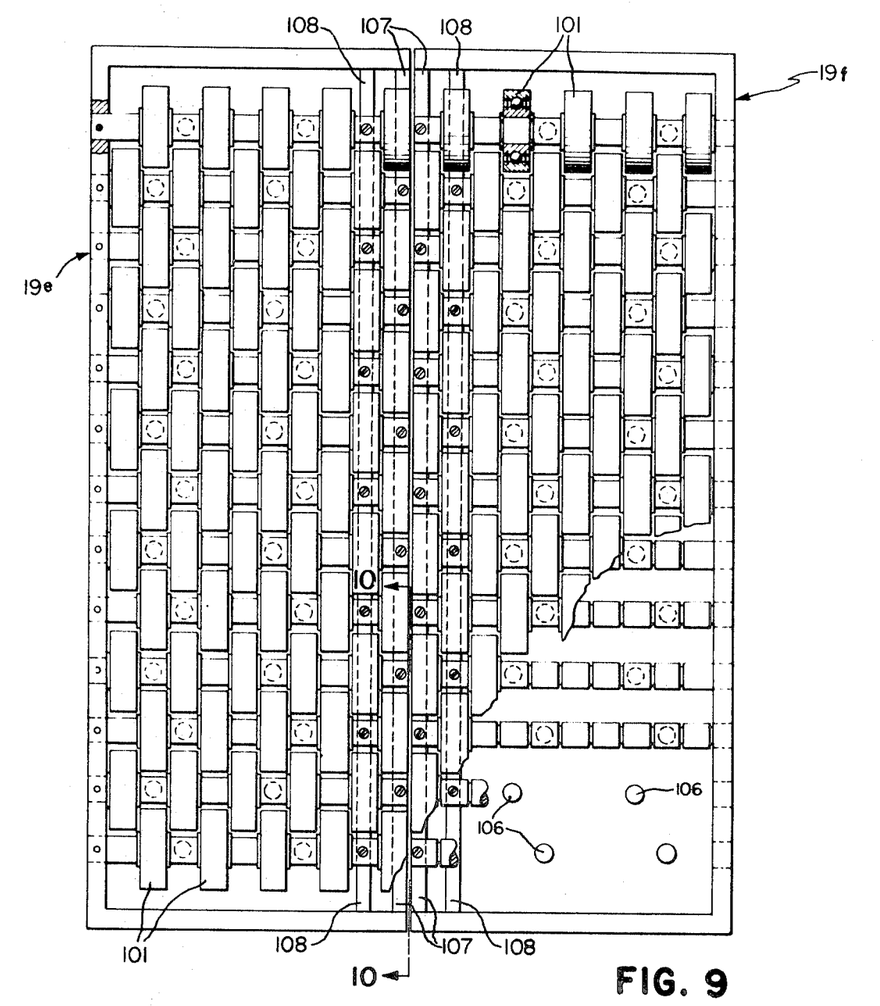
FIG. 9 is a further embodiment of the anvil means of FIG. 8.
Figure 10:
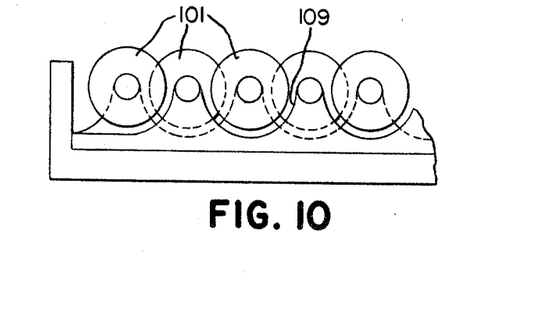
FIG. 10 is a partial section view taken along the lines 10–10 of FIG. 9.

As seen in FIGS. 9 and 10, this series of bearings 101 can be divided into two parallel anvils 19e and 19f by splitting it down the center and supporting the inner ends of the bearing rods 99 on a pair of vertical walls 107, 108 having upright portions 109 projecting upwardly between each two bearings 101 to engage and support rod 99. This provides a means of reading the force variations in separate portions of the footprint and can be used in conjunction with the strain legs 24 and strain bars 25 described above and illustrated in FIGS. 2 and 3.

Figure 12:
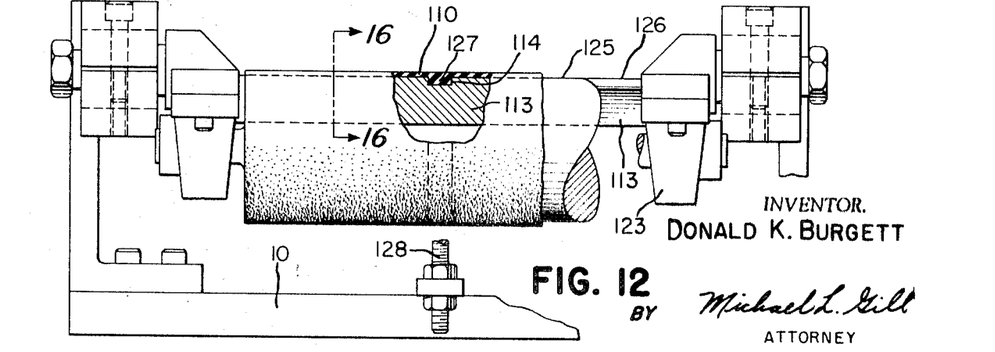
FIG. 12 is an end view of the anvil means of FIG. 11.

In a further embodiment of the invention illustrated in FIGS. 11 and 12, the anvil 19g comprises a flexible endless belt 110 which is disposed about a pair of parallel rollers or pulleys 111, 112 and slides over a generally flat upper support plate 113. The generally flat plate 113 has a straight rectangular groove 114 extending the length of the plate and in line with the long axis of the anvil 19g. As best seen in FIG. 16, the plate is tapered downwardly and inwardly on the ends 118 and 119 and the upper corner of each end is rounded as at 115 to prevent cutting or extra wear on the belt 110 as it slides over the end. The four corners of the plate are each provided with a flat bearing support plate 116, 117, that extends out from the side and beyond the end of the plate 113. The bearing support plates 117 on the end 119 are connected at their outer ends by a transverse bar 120 and are removable from the plate 113 as a unit by removing the bolts 121 which fasten them to the support plate. It is desirable that at least one set of end plates 116 or 117 be removable in order to facilitate installation of the belt 110. The bearing support plates 116 at the opposite end 118 are not removable but are connected at their outer ends by means of a transverse flat bar 122. Pillow block bearings 123 are mounted on the end plates and each pair of bearings supports one of the pair of rollers or pulleys 111, 112. Each pulley 111, 112 has a rectangular circumferential groove 124 in its center which is in alignment with the groove 114 in the plate 113. The pulleys 111 and 112 are mounted such that their top portions 125 lie in the same plane as the top surface 126 of the support plate. A rectangular-shaped rib 127 is molded in the back of and disposed the entire length of the belt 110 along the longitudinal centerline thereof. The rib 127 is received in the grooves 114 and 124 in the flat plate 113 and the pulleys 111, 112, respectively. The grooves 114 and 124 in the plate and in the pulleys are slightly narrower than the rib 127 on the back of the flexible endless belt 110 in order to provide a slight press fit and prevent lateral movement of the belt along the plate. As before, this is done to prevent distortion of the force variation reading by movement of the anvil 19g.

A pair of trunnions 91 similar to those previously described are welded to the opposite sides of the plate 113 and have their common axis lying parallel to and midway between the pulleys 111, 112 in the plane of the top surface of the belt 110.

In order to prevent rocking of the anvil 19g, a vertical threaded rod 128 can be connected at one end to the center of each of the transverse bars 120 and 122 and at the other end to the base 10. These stabilizing rods are not always necessary and when used have no appreciable effect on the force variation readings.

Figures 13, 14, 15:
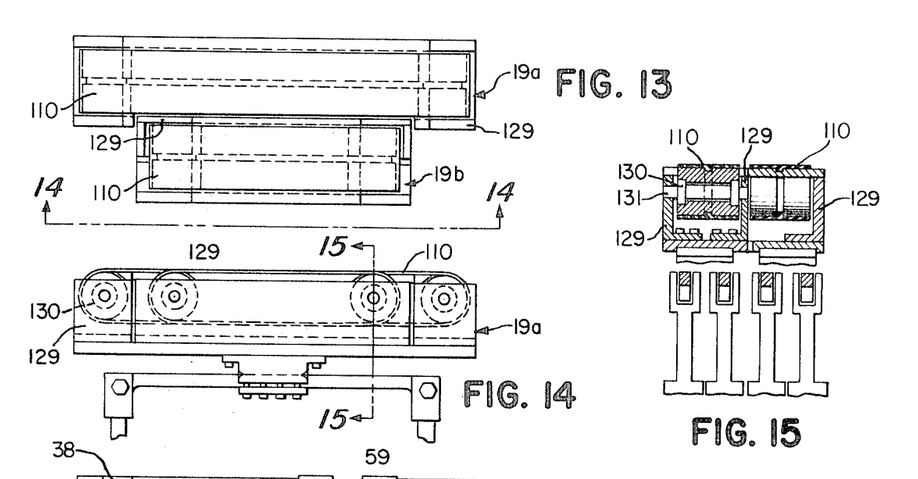
FIG. 13 is an alternate embodiment of the anvil means of FIG. 11.
FIG. 14 is a side view of the apparatus of FIG. 13 taken substantially along the line 14–14.
FIG. 15 is a partial end view of the apparatus of FIG. 14 taken substantially along lines 15–15.

As illustrated in FIGS. 13, 14 and 15, this anvil 19g means could also be split into two parallel anvils by making one anvil 19a longer than the other anvil 19b and replacing the bearing end plates and pillow block bearings with upstanding end plates 129. Bearings 130 are provided in each pulley with a shaft 131 passing therethrough which is supported by the upstanding plates. This allows separate measurement of force variation in different portions of the footprint and can be used in conjunction with the strain legs 24 described above and illustrated in FIGS. 2 and 3.

It will be readily recognized that any of the above-described anvil means can be used in conjunction with the four vertical strain legs 24 and two horizontal strain bars 25 illustrated in FIGS. 2, 3 and 4. This, as described previously, permits continuous measurement of radial force, axial force and rolling resistance variations in separate portions of the tire tread with one setup. Of course, this strain leg and strain bar arrangement could also be used when a single anvil means is utilized.

Due to the friction of the belt 110 on the plate 113 in the embodiment illustrated in FIGS. 11 and 12, this particular unit limits the standard tire rotational speed to about a maximum of 40 revolutions per minute under a load of 1500 pounds. The other units illustrated, however, have been successfully run at speeds of up to 180 revolutions per minute with the tire loaded to 1500 pounds.

While certain representative embodiments and details have been shown for the purpose of illustrating the invention, it will be apparent to those skilled in the art that various changes and modifications may be made therein without departing from the invention.

What I claim is:

1. A tire testing apparatus comprising a rotatable tire support; anvil means for providing a substantially flat footprint in a tire mounted on and rotating with said support, said anvil means being engageable with said tire adjacent the ends of said footprint and intermediate said ends in a single plane and comprising a plurality of closely spaced parallel rollers having upper support lines lying in a single plane and having the outer ends of said rollers supported by antifriction bearings which are larger in diameter than the diameter of said rollers, the bearings being staggered longitudinally of said rollers to permit close spacing of said rollers; means for moving said tire support and said anvil means toward and away from each other to bring said tire into engagement with said anvil means; and means for continuously measuring at least one component of the force exerted by said tire on said anvil means when said tire engages said anvil means.

2. An apparatus as claimed in claim 2, wherein said means for measuring at least one component of the force comprises a pair of parallel rods supporting said anvil, a pair of legs pivotally connected at one end to the ends of each of said rods and perpendicular to said rods, means rigidly mounting the opposite ends of said legs and means for sensing the deflection of said pairs of legs and said pair of rods caused by the force exerted by said tire on said anvil means when said tire engages said anvil means.

3. A tire testing apparatus comprising a rotatable tire support; anvil means for providing a substantially flat footprint in a tire mounted on and rotating with said support, said anvil means being engageable with said tire adjacent the ends of said footprint and intermediate said ends in a single plane and comprising at least two discrete juxtaposed sections whereby different portions of said footprint are supported by separate sections; means for moving said tire support and said anvil means toward and away from each other to bring said tire into engagement with said anvil; means for rotating said tire while said tire is in engagement with said anvil; and sensing means for measuring at least one component of the force exerted on each of said sections by said tire when said tire is rotated and in engagement with said anvil means.

4. An apparatus as claimed in claim 3, wherein said anvil means comprises a plurality of closely spaced parallel rollers having upper support lines lying in a single plane.

5. An apparatus as claimed in claim 4, wherein said means for measuring at least one component of the force comprises a pair of parallel rods supporting each said section, a pair of legs pivotally connected at one end to the ends of each of said rods and perpendicular to said rods, means rigidly mounting the opposite ends of said legs and means for sensing the deflection of said pairs of legs and said pair of rods caused by the force exerted on each said section when said tire engages said anvil means.

6. An apparatus as claimed in claim 5 wherein said rollers are supported on their outer ends by antifriction bearings and said rollers are smaller in diameter than the outer diameter of said bearings, the bearings being staggered longitudinally of said rollers to permit close spacing of said rollers.

7. A method of testing a tire comprising the steps of: rotating said tire; causing the tread portion of said tire to deflect and from a substantially flat footprint during continuous rotation of said tire; and continuously and separately measuring the force required to deflect separate portions of said footprint.